(12) United States Patent
Franck et al.

(10) Patent No.: US 9,205,987 B2
(45) Date of Patent: Dec. 8, 2015

(54) APPARATUS BY MEANS OF WHICH PHARMACEUTICAL PRODUCTS IN THE FORM OF TABLETS, HARD GELATIN CAPSULES OR THE LIKE ARE RETAINED AND POSITIONED IN A PACKAGING INSTALLATION

(75) Inventors: Thomas Franck, Lorch-Weitmars (DE); Thomas Mihalek, Urbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/238,186

(22) PCT Filed: Jul. 6, 2012

(86) PCT No.: PCT/EP2012/063324
§ 371 (c)(1),
(2), (4) Date: Feb. 10, 2014

(87) PCT Pub. No.: WO2013/020763
PCT Pub. Date: Feb. 14, 2013

(65) Prior Publication Data
US 2014/0209432 A1    Jul. 31, 2014

(30) Foreign Application Priority Data
Aug. 10, 2011 (DE) .................... 10 2011 080 746

(51) Int. Cl.
*B65G 47/26* (2006.01)
*B65G 17/12* (2006.01)
(Continued)

(52) U.S. Cl.
CPC ............. *B65G 17/12* (2013.01); *B41F 17/36* (2013.01); *B65B 5/106* (2013.01); *B65B 23/00* (2013.01); *B65B 59/00* (2013.01); *B65B 11/52* (2013.01); *B65B 63/005* (2013.01)

(58) Field of Classification Search
CPC ........................................................ B65G 17/12
USPC ............ 198/418, 470.1, 476.1, 803.9, 803.14
See application file for complete search history.

(56) References Cited

U.S. PATENT DOCUMENTS 2,240,717 A  *  5/1941  Read ............................. 134/154
2,344,000 A  *  3/1944  Read .......................... 198/803.9
(Continued)

FOREIGN PATENT DOCUMENTS

| CN | 1543415 | 11/2004 |
|---|---|---|
| CN | 1652974 | 8/2005 |

(Continued)

OTHER PUBLICATIONS

International Search Report for Application No. PCT/EP2012/063324 dated Dec. 13, 2012 (English Translation, 2 pages).

*Primary Examiner* — William R Harp
(74) *Attorney, Agent, or Firm* — Michael Best & Friedrich LLP

(57) ABSTRACT

The invention relates to an apparatus (10) by means of which pharmaceutical products (1) in the form of tablets, hard gelatin capsules or the like are retained, and positioned, in a packaging installation (100), having a carrier element (11) which has a multiplicity of format-dependent holders (27) for the products (1), wherein the carrier element (11) can be fastened, preferably in an interchangeable manner, on a conveying apparatus (12) of the packaging installation (100). According to the invention, it is provided that there is a retaining element (30) in operative connection with the carrier element (11), the retaining element having, for each product (1), a respective clamping element (32) in alignment with the respective holder (27), and that the retaining element (30) is arranged for movement between two positions in relation to the carrier element (11) such that, in a first position, in order for the products (1) to be introduced into the holders (27) and/or discharged therefrom, the clamping elements (32) are not in contact with the products (1), and that, in a second position, the clamping elements (32) fix the products (1) in the holders (27).

23 Claims, 6 Drawing Sheets

(51) Int. Cl.
  *B41F 17/36* (2006.01)
  *B65B 23/00* (2006.01)
  *B65B 59/00* (2006.01)
  *B65B 5/10* (2006.01)
  *B65B 11/52* (2006.01)
  *B65B 63/00* (2006.01)

(56) References Cited

U.S. PATENT DOCUMENTS

| | | | |
|---|---|---|---|
| 2,688,352 A * | 9/1954 | Ashlock, Jr. | 99/550 |
| 3,090,296 A | 5/1963 | Wilhelm | |
| 3,556,281 A * | 1/1971 | Margaroli et al. | 198/384 |
| 3,804,103 A * | 4/1974 | Cozzoli | 134/48 |
| 4,069,753 A | 1/1978 | Ackley et al. | |
| 4,125,120 A * | 11/1978 | Standley | 134/126 |
| 5,285,801 A * | 2/1994 | Klenk | 134/73 |
| 5,870,949 A * | 2/1999 | Cimperman et al. | 99/559 |
| 5,979,309 A | 11/1999 | Boyce | |

FOREIGN PATENT DOCUMENTS

| | | |
|---|---|---|
| CN | 1850562 | 10/2006 |
| CN | 1938192 | 3/2007 |
| DE | 102008013403 | 9/2009 |
| JP | S431602 | 1/1968 |

* cited by examiner

APPARATUS BY MEANS OF WHICH PHARMACEUTICAL PRODUCTS IN THE FORM OF TABLETS, HARD GELATIN CAPSULES OR THE LIKE ARE RETAINED AND POSITIONED IN A PACKAGING INSTALLATION

BACKGROUND OF THE INVENTION

The invention relates to an apparatus for retaining and positioning pharmaceutical products in the form of tablets, hard gelatin capsules or the like in a packaging installation.

Such an apparatus is known from the German patent publication DE 10 2008 013 403 A1 as a component of a capsule filling machine and closing machine. To this end, the known apparatus comprises two receiving elements which interact with one another for, for example, respectively five hard gelatin capsules. Said receiving elements serve to initially separate the capsule upper parts from the capsule lower parts, subsequently to meter the filling material in powder form into the capsule lower parts that are open at the top and finally to again bring the receiving elements for the capsule upper parts in alignment with the receiving elements for the capsule lower parts in order to close the hard gelatin capsules. The receiving elements for the capsule lower parts of the apparatus have respectively a holder in the form of a through-hole so that the capsule lower parts are, for example, clampingly positioned in the holders. The capsule lower parts are discharged from the holders by means of discharge rams which are moved into the through-holes from below and enter into operative connection with the capsule lower parts and which discharge the capsule lower parts or the hard gelatin capsules from the holders of the receiving elements when the discharge rams move upwards. The pharmaceutical products can only be clampingly positioned in the holders of the apparatus without damage thereto if said products, as is the case with hard gelatin capsules, have a certain elasticity; thus enabling a clamping closure to be achieved in the holders. A positioning or retaining of pharmaceutical products in a clamping manner, which products are not elastically configured and therefore can be fixed by clamps, is however not possible with the known apparatus. A typical application of such an apparatus relates to the labeling of tablets. To this end, the tablets have to be fixed in a certain position or location during the labeling process in order to perform the labeling with a laser or something similar.

SUMMARY OF THE INVENTION

Based on the prior art described above, the aim underlying the invention is to modify an apparatus for retaining and positioning of pharmaceutical products such that pharmaceutical products that cannot be elastically deformed, in particular tablets, can be retained or positioned. This aim is met according to the invention by an apparatus for retaining and positioning pharmaceutical products by virtue of the fact that a retaining element is provided in operative connection with a carrier element that receives the products, said retaining element comprising in each case a clamping element for each product in alignment with the respective holder for the product, and that the retaining element is arranged for movement between two positions in relation to the carrier element such that, in a first position, in order for the products to be introduced into the holders and/or discharged therefrom, the clamping elements are not in contact with the products and that, in a second position, the clamping elements fix the products in the holders.

In order on the one hand to be able to transport as large a number of pharmaceutical products (for example 160 tablets) as possible and on the other hand to be able to produce the clamping elements as simply and cost effectively as possible, provision is made in a particularly preferred constructive embodiment of the invention for the retaining element to be designed as a retaining plate and for the clamping elements to be designed as clamping sections in the retaining plate which are designed to be integrally connected to said retaining plate by means of cutouts or the like.

In order to protect in particular the clamping elements from external interventions, provision can be made in a further embodiment of the aforementioned variant for the retaining plate to be covered by a cover plate on the side facing away from the carrier element, said cover plate being connected at least indirectly to the carrier element, and for apertures for the products to be configured in the cover plate in alignment with the holders, said apertures preferably surrounding the products so as to be spaced apart from the same.

In order to be able to adapt relatively easily to different formats of the pharmaceutical products, provision is furthermore made in an advantageous manner for the format dependent holders to be configured in format strips which can be inserted into holders of the carrier element.

After the pharmaceutical products have been labeled, it is, for example, necessary for the pharmaceutical products to be able to be discharged from the holders of the carrier element as easily and reliably as possible without damaging the same; thus enabling said products to proceed on to further processing stations, e.g. for packaging in blister packs or something similar. To this end, provision is made in a further embodiment of the invention for the holders to comprise apertures or through-holes and for discharge rams to be able to be inserted in the apertures or through-holes, said discharge rams being disposed in the region of an immediately subsequent station of the packaging installation and thus discharging the products from the holders.

It is also important to prevent the pharmaceutical products from inadvertently being removed from or from falling out of the holders of the carrier element between the individual processing stations along their transport path within the packaging installation. Provision is therefore made in a further variant of the invention for the retaining element to interact with a spring element which applies force to said retaining element in the direction of the second position; thus enabling the pharmaceutical products to be securely fixed in the holders.

In order to effect the removal of the pharmaceutical products from the holders of the carrier element, it is necessary for the retaining element (retaining plate) to no longer be disposed in operative connection with the pharmaceutical products. Because, as has already been explained, force is applied to the retaining plate by a spring element, which force securely retains the pharmaceutical products in the holders, provision is therefore made for the retaining element to interact with a transmission element by means of which the retaining element can be moved into the first position.

In a very preferred manner, provision is thereby made for the transmission element to interact with a preferably stationary counter element disposed in the region of the packaging installation. Such a counter element can, for example, be provided in the form of a simply configured track which enters into operative connection with the retaining element when the carrier element moves past said track and thus displaces said retaining element into the first position.

BRIEF DESCRIPTION OF THE DRAWINGS

Further advantages, features and details of the invention ensue from the following description of preferred exemplary embodiments as well as with the aid of the drawings.

In the drawings.

DETAILED DESCRIPTION

Figure 1:
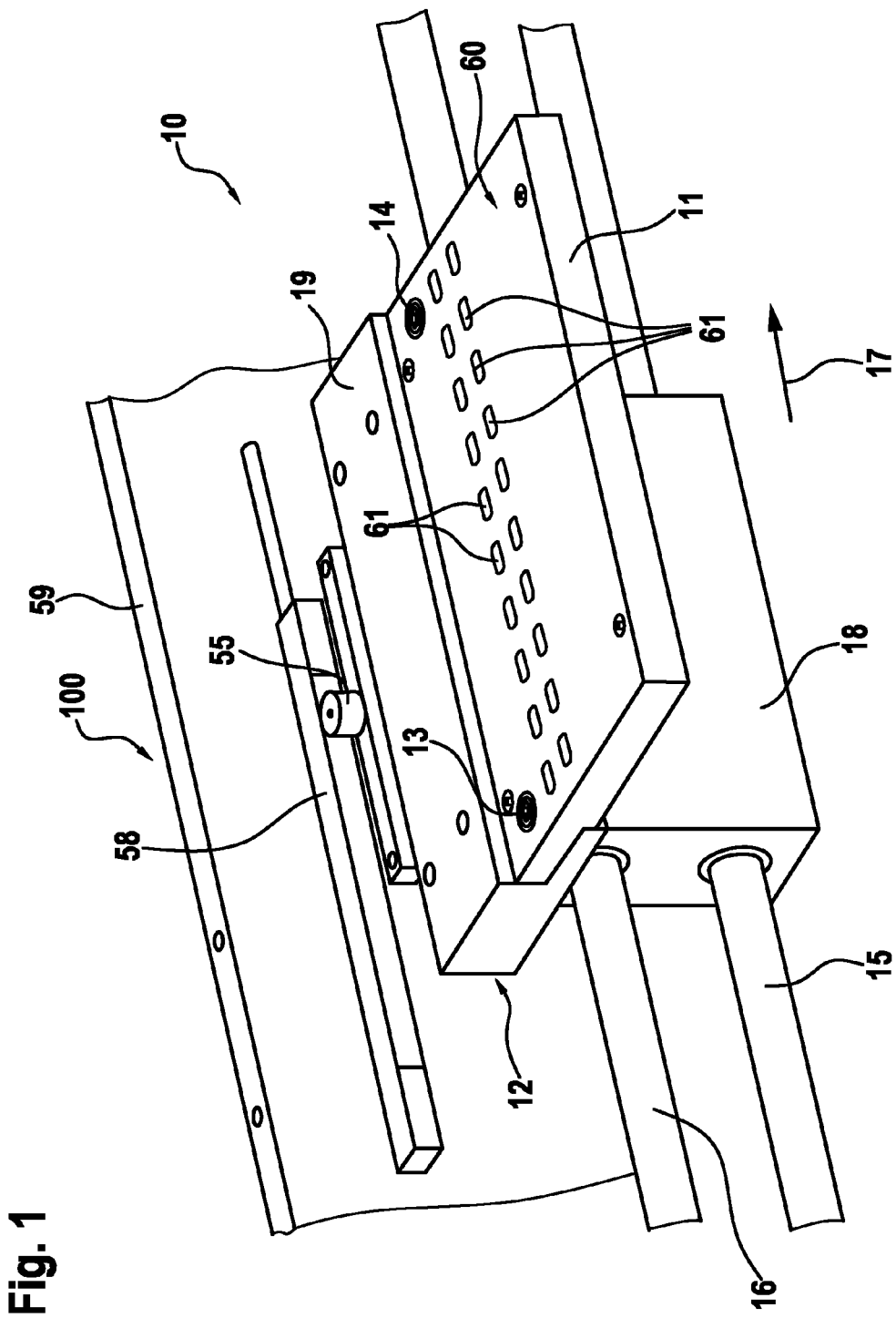
FIG. 1 shows a section from a packaging installation in the region of an inventive apparatus for retaining and positioning tablets.

Identical components or components having the same function are provided with the same reference numerals in the figures.

Figure 6:
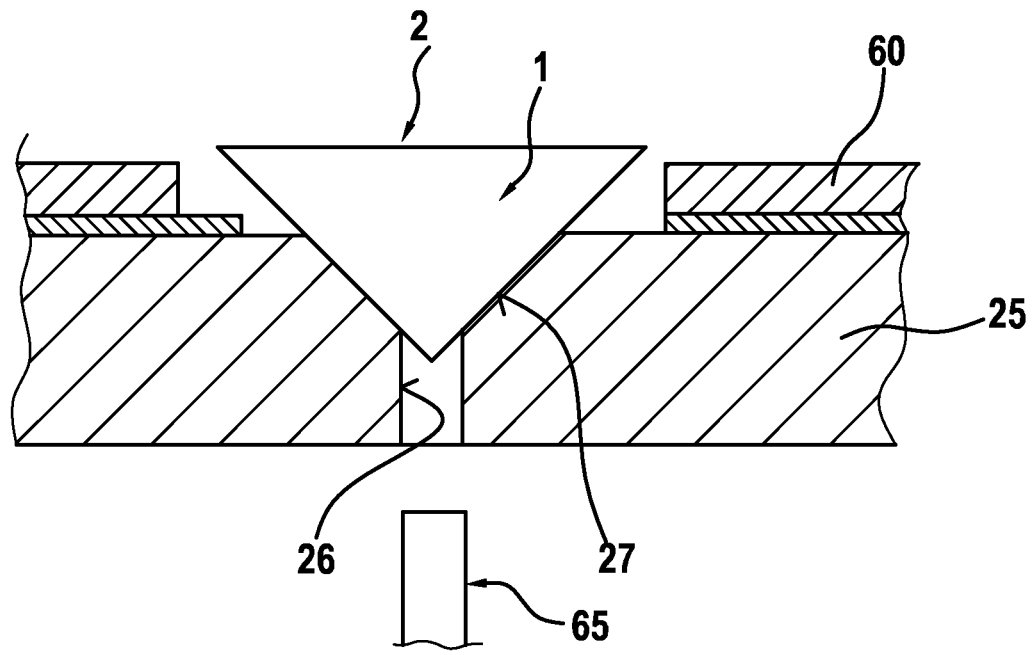

An apparatus 10 for retaining and positioning pharmaceutical products in the form of tablets 1, hard gelatin capsules or something similar in a packaging installation 100 is depicted in FIG. 1. By means of the apparatus 10, tablets 1 are to be retained and positioned in particular for marking or labeling of a lateral face 2 thereof in the region of a labeling station, which is not depicted (FIG. 6). The tablets 1 are for that reason triangular shaped with a constant height. Said tablets can also however be formed differently. It is only essential that that the tablets 1 be positioned and retained by the apparatus 10 in the region of the aforementioned labeling station such that the labeling station can mark the tablets 1 in a precisely positioned manner at the position on the lateral face 2 provided therefore.

Figure 2:
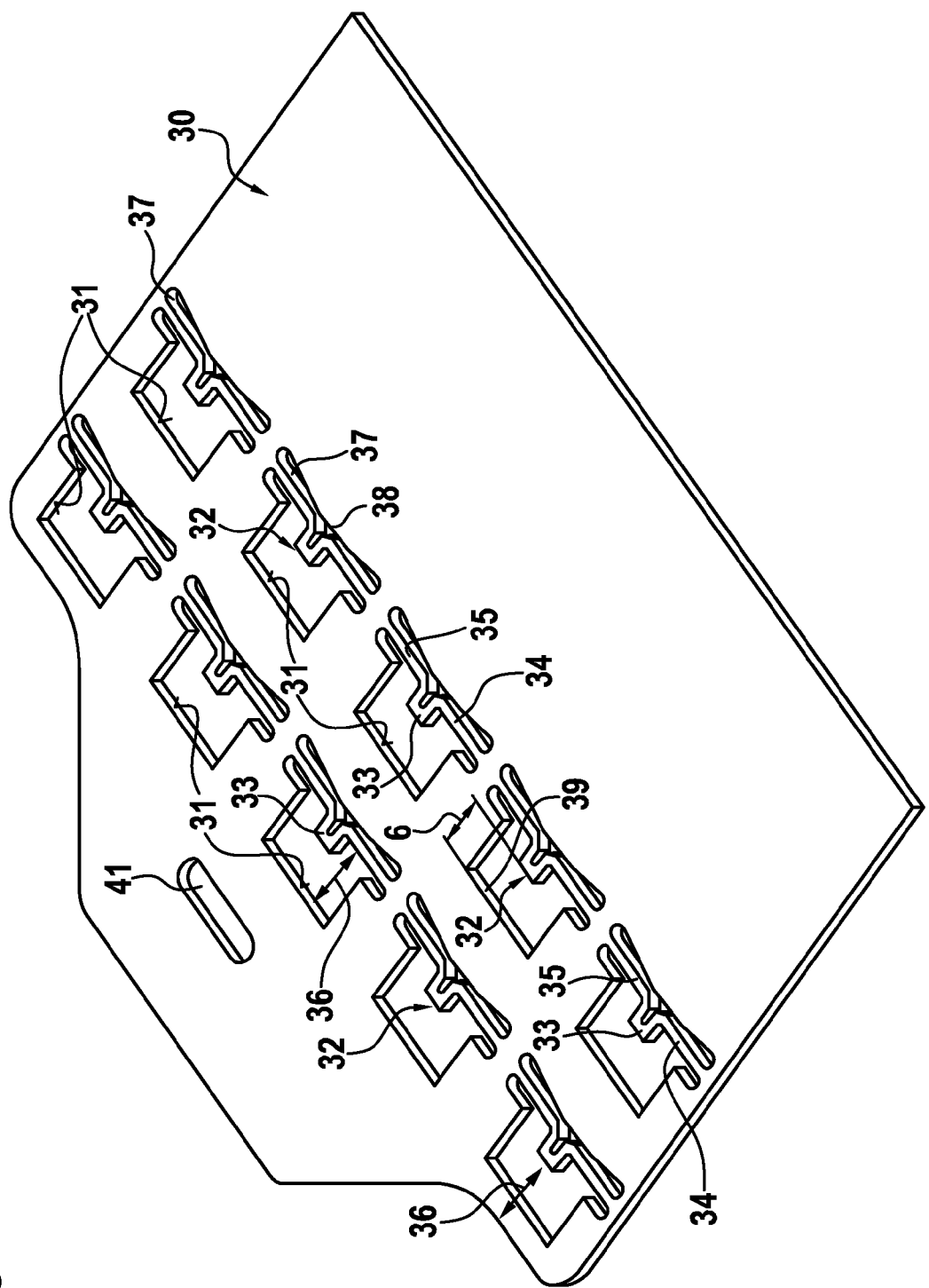
FIG. 2 shows a retaining plate for tablets used with an apparatus pursuant to FIG. 1 in a perspective view.
Figure 3:
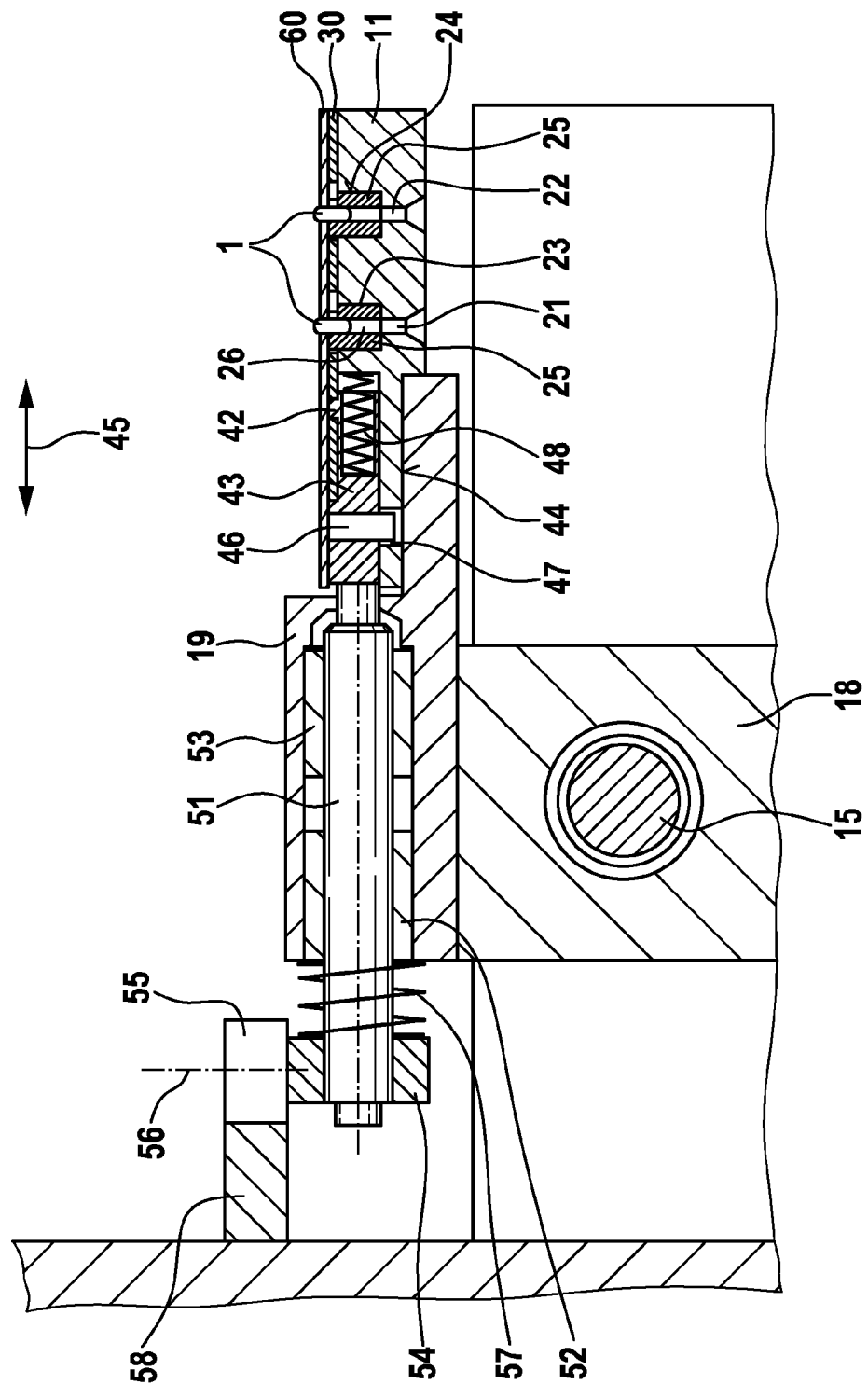
FIG. 3 shows the apparatus pursuant to FIG. 1 in a longitudinal section, in which the tablets are being introduced into or discharged from said apparatus.

The apparatus 10 comprises a substantially plate-shaped carrier element 11 which, in the exemplary embodiment, is fastened in an interchangeable manner to a carriage by means of two screws 13, 14. The carriage 12 is guided as a part of a conveying apparatus of the packaging installation 100 in two guide rods 15, 16 such that the carriage 12 is conveyed in particular in a clocked manner by means of non-depicted drive means, by way of example, in the direction of the arrow 17. The carriage 12 consists of a guide block 18 and a fastening plate 19 to which the carrier element 11 is in turn fastened, as can particularly be seen when considering FIGS. 1 to 3 together.

In the exemplary embodiment, two rows comprising in each case through-holes 21, 22 arranged at uniform distances to one another are configured in the carrier element 11. The number and arrangement of the through-holes 21, 22 are thereby suited to the respective specific requirements. Provision can also be particularly made for more or less rows of through-holes 21, 22 to be configured in the carrier element 11.

Figure 4:
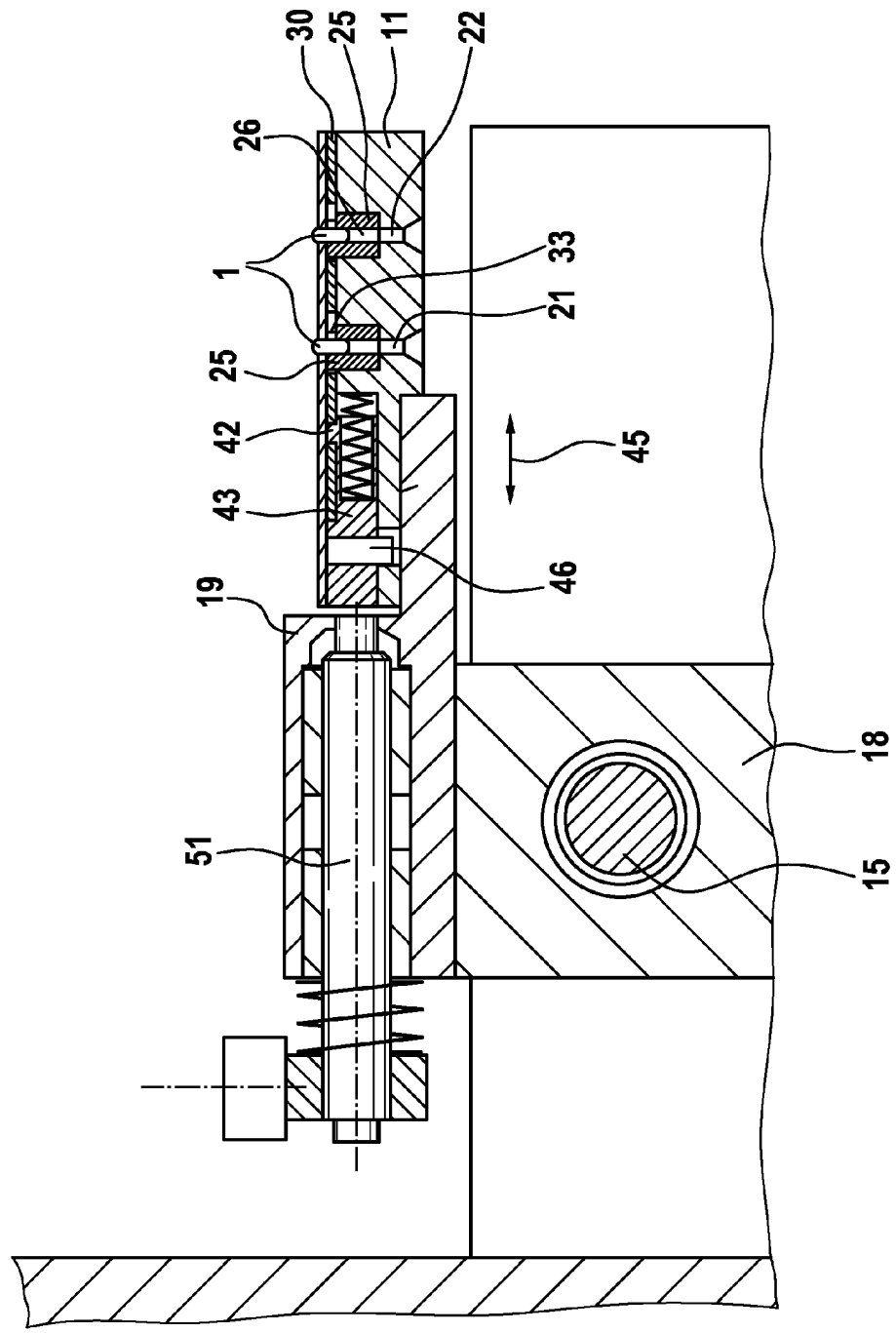
FIG. 4 shows a section corresponding to FIG. 3 in a tensioned state of the retaining plate.
Figure 5:
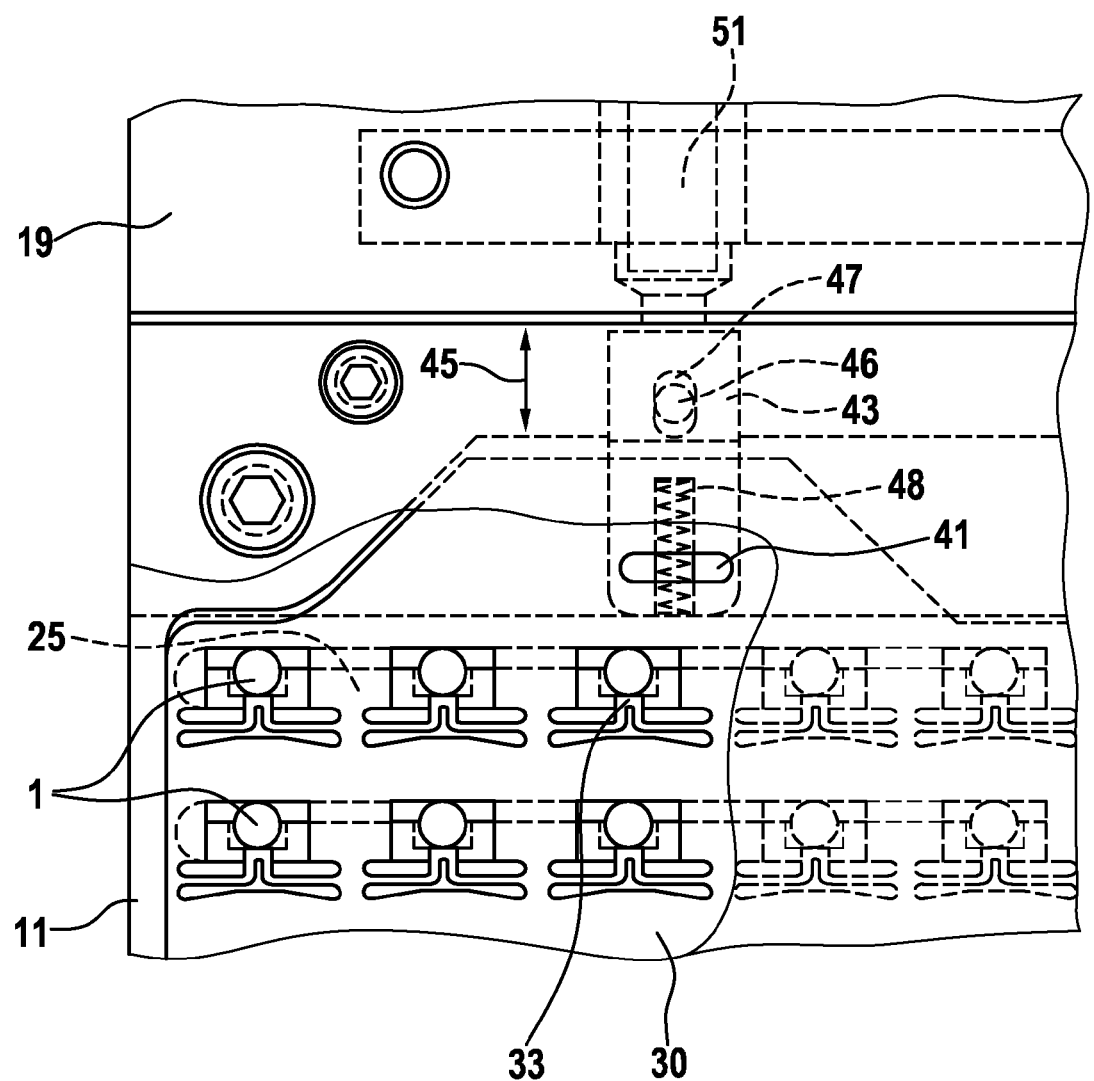
FIG. 5 shows a top view of the apparatus pursuant to FIG. 4 in the region of the carrier element and FIG. 6 shows a tablet accommodated in a holder in a cross-sectional view.

Whereas the through-holes 21, 22 open out on the bottom side of the carrier element 11 in a funnel-shaped manner, two groove-like receiving channels 23, 24 are configured on the top side of the carrier plate 11 in alignment with the through-holes 21, 22. Format-dependent receiving strips 25 for the tablets 1 can be inserted in said receiving channels 23, 24. The receiving strips 25 disposed perpendicularly to the drawing plane of FIGS. 3 and 4 comprise in turn through-holes 26 which are aligned flush with the through-holes 21, 22. The receiving strips 25 have holders 27 that are adapted to the form of the tablets 1 in a positive-fit manner and position the tablets 1 in the receiving strips 25 such that the lateral face 2 of the tablets to be labeled is disposed parallel to the top side of the carrier element 11 and protrudes beyond the same (FIG. 6). When performing a format change, it is therefore only necessary to exchange the receiving strips 25 for receiving strips 25 having a different format.

A retaining element in the form of a retaining plate 30 is disposed on the top side of the carrier element 11. The retaining plate 30 depicted in detail in FIG. 2 comprises apertures in the form of cutouts 31 for each tablet 1 in alignment with the holders 27 or the through-holes 21, 22. To this end, the retaining plate 30 advantageously consists, for example, of plastic material having relatively little thickness. A clamping element 32 formed by a cutout is associated with each cutout 31. The clamping element 32 has a clamping lug 33 on the side facing the tablet 1, said clamping lug being connected via two connecting webs 34, 35 to the base body of the retaining plate 30. An elastic mobility of the clamping lug 33 acting in the direction of the double arrow 36 is achieved by means of the connecting webs 34, 35. In order to delimit the movement of the clamping lug 33 in the one direction, the slot-shaped cutout 31 formed on the side opposite the clamping lug 33 has a locating face 38. It is important that the width b of the cutouts 31 between the longitudinal side 39 of the cutout 31 and the clamping lug 33 is sized large enough to allow the tablets 1 to be introduced into the cutouts 31. At the same time, the two connecting webs 34, 35 are spaced apart from the locating face 38. Finally, the retaining plate 30 has a slotted hole 41 in which a projection 42 of a slider 43 engages, as can best be seen with the aid of FIGS. 3 and 4.

The slider 43 is received in a holder 44 of the carrier element 11 and can be moved in the direction of the double arrow. A stop pin 46 is pressed into a through-hole of the slider 43, the lower end of which stop pin engages in a slotted hole 47 which is formed in the carrier element 11. The adjustment range of the slider 43 and thus also the adjustment range of the retaining plate 30 is delimited in the direction of the double arrow 45 by means of the stop pin 46. The slider 43 is furthermore disposed in operative connection with a compression spring 48 which applies a spring force to the slider 43 and consequently also to the retaining plate 30 such that the retaining plate 30 is pressed towards the fastening plate 19; and thus the tablets 1 are positioned or fixed by the retaining plate 30 or the clamping elements 32 in the cutouts 31.

The end of the slider 43 facing away from the compression spring 48 interacts with a pressure pin 51 which is arranged for movement in the fastening plate 19 in two bearings 52, 53 likewise in the direction of the double arrow 45. The end of the pressure pin 51 coming out of the fastening plate 19 is connected to a strip 54, a roller 55 being rotatably mounted in an axis 56 approximately in the center of the top side of said strip. The pressure pin 51 is pressed in the direction opposite the slider 43 by means of a further compression spring 57.

The roller 55 interacts with a guide rail 58 as a counter element which is depicted by way of example in FIG. 1 and is fixedly disposed on the support frame 59 of the packaging installation 100.

The retaining plate 30 is covered by a cover plate 60, which is in turn connected to the carrier element 11, on the side facing away from said carrier element 11. The cover plate 60 has apertures 61 which are aligned with the cutouts 31 in such a manner that the tablets 1 protrude with a lateral face 2 thereof beyond the cover plate 60, wherein the apertures 61 surround the tablet 1 or the lateral face 2 so as to be spaced apart therefrom.

The apparatus 10 described to this point operates as follows: In order to introduce or discharge the tablets 1 into/from the carrier element 11, it is necessary for the retaining plate 30 to be located in a first position in which said retaining plate does not interact with the tablets 1 or does not retain said tablets in the holders 27. To this end, provision is made corresponding to the FIGS. 1 and 3 for the slider 43 to be pressed towards the holders 27 via the pressure pin 51, which is impinged with force via the roller in operative connection with the guide rail 58 against the spring force of the compression spring 57, whereby the retaining plate 30 assumes a position in which the tablets 1 can be inserted into the holders 27 of the receiving strips 25 without said tablets being in operative connection with the clamping lugs 33 of the retaining plate 30. After the carrier element 11 has moved in accordance with the arrow 17 out of the region of the guide rail 58, the retaining plate 30 is subsequently brought into the second position thereof which fixes the tablets 1 in the holders 27 as a result of the spring force of the compression spring 48. This results due to the fact that the pressure pin 51 outside of the guide rail 58 moves out of contact with the slider 43; thus enabling the retaining plate 30 and therefore also the clamping lugs 33 to move by means of the compression spring 48 towards the fastening plate 19. In this position, the tablets 1 can be fed in particular to the labeling station (not depicted), wherein a precise positioning for labeling the lateral faces 2 of the tablets 1 is made possible by the clamping lock between the clamping plate 30 or the clamping lugs 33 and the tablets 1. After the tablets 1 have been labeled, the carrier element 11 subsequently enters into operative connection with a further guide rail 58 which brings the retaining plate 30 or the clamping lugs 33 again in the first position. In order to discharge the tablets 1 from the holders 27 of the carrier element 11, discharge rams 65 are disposed in the region of an adjoining station that is not depicted (FIG. 6), said discharge rams entering into the through-holes 21, 22, 26 of the carrier element 11 and the receiving strips 25 and by means of abutting contact with the tablets 1 discharge the same from the holders 27.

The apparatus 10 described to this point can be altered or modified in a variety of ways without deviating from the concept of the invention.

The invention claimed is:

1. An apparatus (10) by means of which pharmaceutical products (1) in the form of tablets, hard gelatin capsules or the like are retained, and positioned, in a packaging installation (100), having a carrier element (11) which has a multiplicity of format-dependent holders (27) for the products (1), wherein the carrier element (11) is coupled to a conveying apparatus (12) of the packaging installation (100), and comprising a retaining element (30) coupled to the carrier element (11), the retaining element having, for each product (1), a respective clamping element (32) in alignment with a respective one of the holders (27), wherein the retaining element (30) is arranged for movement between two positions in relation to the carrier element (11) such that, in a first position, in order for the products (1) to be introduced into the holders (27) or discharged therefrom, the clamping elements (32) are not in contact with the products (1), and that, in a second position, the clamping elements (32) fix the products (1) in the holders (27), wherein the retaining element is a holding plate (30) and wherein the clamping elements (32) are integrally connected via connecting webs (34, 35) to the retaining plate (30), wherein the clamping elements (32) are formed by cutouts (31, 37) and have clamping sections (33).

2. The apparatus according to claim 1, wherein the retaining plate (30) is covered by a cover plate (60) on a side facing away from the carrier element (11), the cover plate being at least indirectly connected to the carrier element (11), and wherein apertures (61) for the products (1) are configured in the cover plate (60) in alignment with the holders (27).

3. The apparatus according to claim 2, wherein the products (1) protrude beyond the cover plate (60) on the side facing away from the carrier element (11).

4. The apparatus according to claim 1, wherein the format-dependent holders (27) are configured in format strips (25) which are insertable into receiving channels (23, 24) of the carrier element (11).

5. The apparatus according to claim 1, wherein the holders (27) comprise apertures or through-holes (26) and wherein discharge rams (65) which are disposed in a region of an adjoining station of the packaging installation (100) are insertable into the apertures or through-holes (26) and thereby are configured to discharge the products (1) from the holders (27).

6. The apparatus according to claim 1, wherein the retaining element (30) interacts with a spring element (48) which applies force to said retaining element (30) in a direction of the second position.

7. The apparatus according to claim 1, wherein the retaining element (30) interacts with a transmission element (51) by means of which said retaining element (30) is movable into the first position.

8. The apparatus according to claim 7, wherein the transmission element (51) interacts with a counter element (58) which is disposed in a region of the packaging installation (100).

9. The apparatus according to claim 7, wherein the transmission element (51) interacts with a stationary counter element (58) which is disposed in the region of the packaging installation (100).

10. The apparatus according to claim 1, wherein the retaining element (30) interacts with a locating element (46) which delimits an adjustment range of said retaining element (30) between the two positions.

11. The apparatus according to claim 1 wherein the carrier element (11) is releasable fastened to the conveying apparatus (12) of the packaging installation.

12. The apparatus according to claim 1, wherein the retaining plate (30) is covered by a cover plate (60) on the side facing away from the carrier element (11), the cover plate being at least indirectly connected to the carrier element (11), and wherein apertures (61) for the products (1) are configured in the cover plate (60) in alignment with the holders (27) and surround the products (1) so as to be spaced apart from the same.

13. An apparatus (10) by means of which pharmaceutical products (1) in the form of tablets, hard gelatin capsules or the like are retained, and positioned, in a packaging installation (100), having a carrier element (11) which has a multiplicity of format-dependent holders (27) for the products (1), wherein the carrier element (11) is configured to be fastened on a conveying apparatus (12) of the packaging installation (100), and comprising a retaining element (30) coupled to the carrier element (11), the retaining element having, for each product (1), a respective clamping element (32) in alignment with a respective one of the holders (27), and wherein the retaining element (30) is arranged for movement between two positions in relation to the carrier element (11) such that, in a first position, in order for the products (1) to be introduced into the holders (27) or discharged therefrom, the clamping elements (32) are not in contact with the products (1), and that, in a second position, the clamping elements (32) fix the products (1) in the holders (27), wherein the holders (27) comprise apertures or through-holes (26) and wherein discharge rams (65) which are disposed in a region of an adjoining station of the packaging installation (100) are insertable into the apertures or through-holes (26) and thereby are configured to discharge the products (1) from the holders (27).

14. The apparatus according to claim 13, wherein the retaining plate (30) is covered by a cover plate (60) on a side facing away from the carrier element (11), the cover plate being at least indirectly connected to the carrier element (11), and wherein apertures (61) for the products (1) are configured in the cover plate (60) in alignment with the holders (27).

15. The apparatus according to claim 14, wherein the products (1) protrude beyond the cover plate (60) on the side facing away from the carrier element (11).

16. The apparatus according to claim 14, wherein the retaining plate (30) is covered by a cover plate (60) on the side facing away from the carrier element (11), the cover plate being at least indirectly connected to the carrier element (11), and wherein apertures (61) for the products (1) are configured in the cover plate (60) in alignment with the holders (27) and surround the products (1) so as to be spaced apart from the same.

17. The apparatus according to claim 13, wherein the format-dependent holders (27) are configured in format strips (25) which are insertable into receiving channels (23, 24) of the carrier element (11).

18. The apparatus according to claim 13, wherein the retaining element (30) interacts with a spring element (48) which applies force to said retaining element (30) in a direction of the second position.

19. The apparatus according to claim 13, wherein the retaining element (30) interacts with a transmission element (51) by means of which said retaining element (30) is movable into the first position.

20. The apparatus according to claim 19, wherein the transmission element (51) interacts with a counter element (58) which is disposed in a region of the packaging installation (100).

21. The apparatus according to claim 19, wherein the transmission element (51) interacts with a stationary counter element (58) which is disposed in the region of the packaging installation (100).

22. The apparatus according to claim 13, wherein the retaining element (30) interacts with a locating element (46) which delimits an adjustment range of said retaining element (30) between the two positions.

23. The apparatus according to claim 13 wherein the carrier element (11) is releasably fastened to the conveying apparatus (12) of the packaging installation.

\* \* \* \* \*